D. W. HUGHES.
Horse or Hand Hoe-Tooth.
No. 222,500. Patented Dec. 9, 1879.
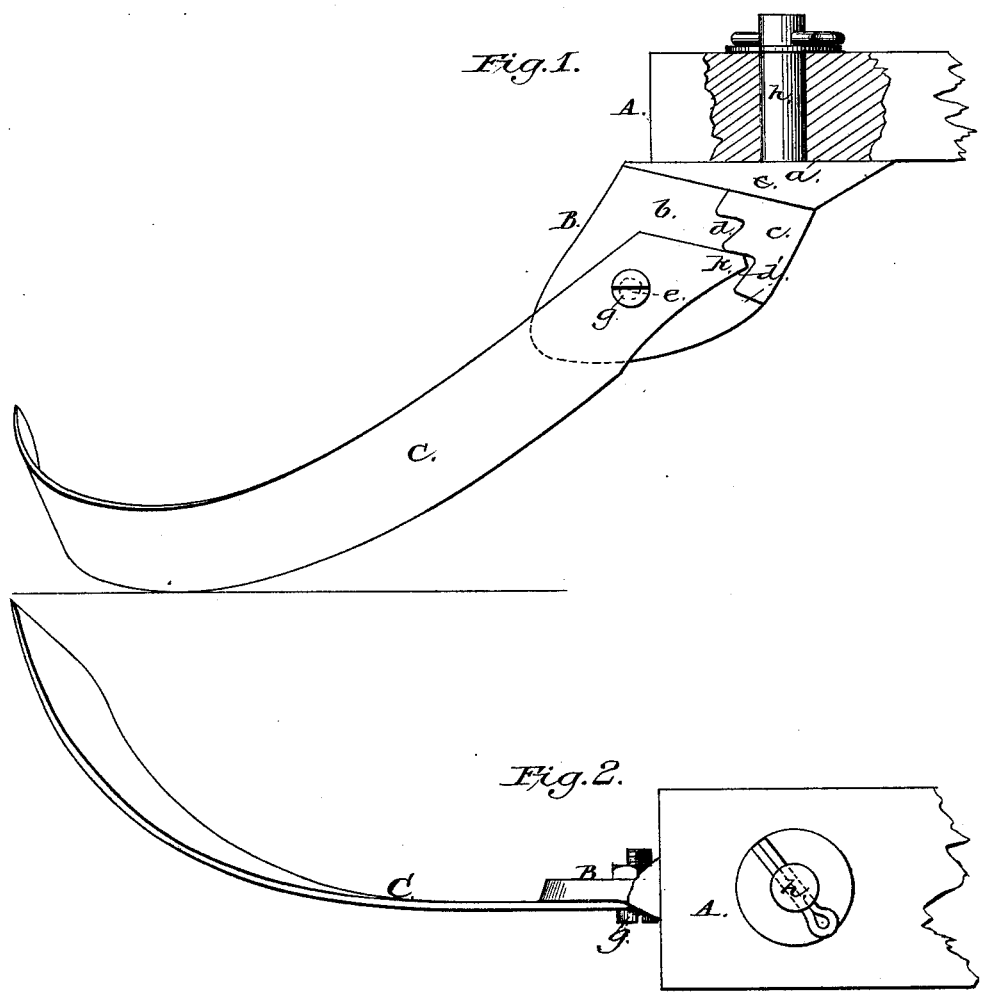

UNITED STATES PATENT OFFICE.

DAVID W. HUGHES, OF HAMILTON, OHIO.

IMPROVEMENT IN HORSE OR HAND HOE TEETH.

Specification forming part of Letters Patent No. 222,500, dated December 9, 1879; application filed October 18, 1879.

*To all whom it may concern:*

Be it known that I, DAVID W. HUGHES, of Hamilton, in the county of Butler and State of Ohio, have invented a new and valuable Improvement in Horse or Hand Hoe Teeth; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side view of my improved hoe-tooth, and Fig. 2 is a top view of the same.

This invention has relation to the working-teeth of cultivators or horse-hoes; and it consists in the construction and novel arrangement of the adjustable inclined and laterally-curved blade, in connection with the holder or head portion, which is attached to the beam or frame, as hereinafter fully shown and described.

In the accompanying drawings, the letter A designates the beam or portion of any suitable hoe or cultivator frame to which the teeth may be attached.

B indicates the holder or head portion of the tooth, which is usually cast with a broad bearing, $a$, and depending flange $b$, having on its side face an oblique shoulder, $c$, in the edge of which are notches or projections, (indicated at $d$ $d'$.) In rear of said offset, and nearly equidistant from its notches or projections, is made through the flange $b$ a perforation, $e$, through which passes the bolt $g$, which secures the blade of the tooth to the head. Extending upward from the bearing $a$ is a tang, $h$, which passes through the beam, forming a strong connection. This is usually made in cylindrical or journal form, so that the tooth may turn from side to side; but the attachment to the beam may be rigid, if desired.

C represents the blade of the tooth. This is of thin steel, slightly curved upward, and having a marked lateral bend, as shown in the drawings, this bend being nearly sufficient to bring the rear end of the blade at right angles with its forward end. The rear end of the blade is curved upward to its upper edge, as shown, and the lower edge thereof is sharpened.

In position the blade is inclined to the rear and downward from the head, its faces being vertical in its upper or forward portion, and inclined upward and backward from the cutting-edge in its rear or curved portion, so that while it will ride easily over stones, roots, and other obstructions, it will also, as it moves forward, gather the earth in its curve, and turn the ground in a manner similar to that of the mold-board of a plow.

When arranged in swivel form, as indicated in the drawings, it is self-adjusting, relieving itself of lateral strain when coming in contact with obstructions, such as roots or stones, yet following in its course the direct line of draft, one side of the curved blade forming the land-side and the other the mold-board or turning portion when in the ground, cutting loose all weeds and grass which may be gathered inside of the curve.

The upper or forward end of the tooth in front of the pivot or fastening-bolt is made in angular or pointed form, as shown at $k$, this angle or point being of sufficient length to reach into the notches or between the projections of the offset on the side of the flange of the head. As this adjusting-offset is oblique its notches or projections are of different heights with relation to the pivotal point or bolt-hole $e$, and the inclination of the blade can be readily varied by changing its forward angle or adjusting end from one to another of said notches, this being accomplished in the construction illustrated by loosening the nut on the opposite side of the holding-flange, and after the adjustment has been effected tightening the same.

When the blades are used in wet soil, if they are set in the highest notches of the holders they may gather grass and roots and work with difficulty. This is easily avoided by adjusting them at a lower inclination, the higher adjustment serving better for dry or clear ground.

This tooth is designed for the cultivation of all kinds of crops, or for pulverizing rough, cloddy, or sod land, in this service superseding the ordinary harrow.

What I claim as my invention, and desire to secure by Letters Patent, is—

1. The swivel cultivating or hoe tooth, consisting of the journaled head B, having the broad bearing $a$, flange $b$, and adjustment notches or projections $d$ $d'$, and the inclined adjustable laterally-curved blade C, substantially as specified.

2. The combination, with the head B, having the notched oblique adjustment-offset $c$, of the inclined laterally-curved blade bolted thereto, and having the forward adjustment angle $k$ to engage said offset, substantially as specified.

In testimony that I claim the above I have hereunto subscribed my name in the presence of two witnesses.

DAVID W. HUGHES.

Witnesses:
 CLARK LANE,
 M. L. SEWARD.